United States Patent
Wines et al.

(10) Patent No.: US 9,994,927 B2
(45) Date of Patent: Jun. 12, 2018

(54) LIGHTWEIGHT BORON TUBULAR STRUCTURE SUPPORT INTEGRATED INTO SEAT STRUCTURE

(71) Applicant: L & W Engineering, New Boston, MI (US)

(72) Inventors: Jim Wines, Palmyra, MI (US); Joshua Forquer, Beverly Hills, MI (US); Jason Bigelow, West Bloomfield, MI (US)

(73) Assignee: L&W Engineering, Belleville, MI (US)

( * ) Notice: Subject to any disclaimer, the term of this patent is extended or adjusted under 35 U.S.C. 154(b) by 308 days.

(21) Appl. No.: 14/722,861

(22) Filed: May 27, 2015

(65) Prior Publication Data

US 2016/0237519 A1     Aug. 18, 2016

Related U.S. Application Data

(60) Provisional application No. 62/115,502, filed on Feb. 12, 2015.

(51) Int. Cl.

| | | |
|---|---|---|
| *C22C 38/04* | (2006.01) | |
| *C22C 38/32* | (2006.01) | |
| *C22C 38/38* | (2006.01) | |
| *C21D 8/10* | (2006.01) | |
| *B60N 2/68* | (2006.01) | |
| *C21D 9/08* | (2006.01) | |
| *C21D 6/00* | (2006.01) | |

(52) U.S. Cl.
CPC ............... *C21D 9/085* (2013.01); *B60N 2/68* (2013.01); *C21D 6/005* (2013.01); *C22C 38/32* (2013.01); *C22C 38/38* (2013.01)

(58) Field of Classification Search
None
See application file for complete search history.

(56) References Cited

U.S. PATENT DOCUMENTS

| 8,323,560 B2 * | 12/2012 | Satou | B23K 11/0873 |
| | | | 148/320 |
| 2012/0273089 A1 * | 11/2012 | Sakkinen | B60N 2/0722 |
| | | | 148/218 |

FOREIGN PATENT DOCUMENTS

| JP | H0693339 A | * | 4/1994 | ............. C22C 38/32 |
| JP | 11-229075 | * | 8/1999 | ............. C22C 38/00 |

OTHER PUBLICATIONS

Machine English translation of JPH 0693339-A, Fujioka Yasuhide et al., Apr. 5, 1994.*
Tempering of Induction Hardened Steels, Induction Heating and Heat Treatment. vol. 4C, ASM Handbook, ASM International, 2014, pp. V. Rudnev et al, pp. 1-4, http://products.asminternational.org.*
Machine-English translation of JP11-229075, Fujiwara Tomoya et al., Aug. 24, 1999.*

* cited by examiner

*Primary Examiner* — Deborah Yee
(74) *Attorney, Agent, or Firm* — Fishman Stewart PLLC

(57) ABSTRACT

A support may include a hollow metallic tube having two opposing ends and a body extending over a longitudinal axis of the tube. The tube may have a steel composition that may include, by weight, the following concentrations: approximately 0.19 to 0.27% carbon; approximately 0.0005% to 0.004% boron; approximately 1.5% to 2.5% manganese; and less than or equal to approximately 0.35% chromium, the balance including iron and inevitable impurities.

20 Claims, 2 Drawing Sheets

LIGHTWEIGHT BORON TUBULAR STRUCTURE SUPPORT INTEGRATED INTO SEAT STRUCTURE

CROSS-REFERENCE TO RELATED APPLICATIONS

This application claims priority to U.S. Provisional Patent Application No. 62/115,502, filed Feb. 12, 2015, the contents of which are hereby incorporated in their entirety.

BACKGROUND

The present disclosure relates generally to a tubular structure support, and more particularly to a lightweight boron steel tubular structure support integrated into a seat structure of a vehicle.

Structural supports, such as steel tubes, are hollow tubes that are used in a variety of applications. Structural supports may be produced by two distinct processes that may result in either a seamless or welded support. Raw metal, such as steel, is first cast into a workable starting form, and then is made into a support structure (e.g., a tube) by stretching the steel out into a seamless tube or forcing the edges together and sealing them with a weld.

The steel tube may undergo a heat treatment process to alter the mechanical properties of the material. Generally, heat treatment uses phase transformation during the process to change a microstructure of the material in solid state. These phase and structural transformations may determine the overall mechanical behavior of the steel material, including properties such as strength, hardness, toughness and ductility, and consequently the implementation of the steel tube for industrial applications.

Many industrial applications, including but not limited to vehicle frames and sub-frames, commercial and residential furniture, machinery parts, and building, infrastructural and architectural structural elements, demand lightweight tubular steel structures. As a specific example, an important aim of the automotive industry is to decrease fuel consumption by reducing the weight of the vehicle without sacrificing the structural integrity (e.g., safety) of the vehicle. It is preferred that vehicle structural supports be lightweight to provide improved fuel economy. However, structural supports such as those applicable for vehicle sub-frames preferably have properties of high strength to satisfy the strict standards of crash worthiness and thereby maintain the structural integrity of the vehicle. Yet, conventional engineering materials and processes force a trade-off between costs and fuel efficiency and/or safety.

Overcoming these concerns would be desirable and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
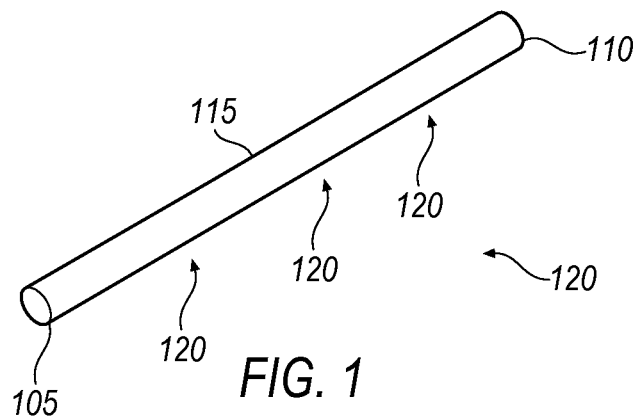
FIG. 1 illustrates a tubular structure support according to one example.

An exemplary tubular structure support may include a low-alloy, low to mid carbon content steel that is lightweight and cost efficient while maintaining attractive mechanical properties such as yield strength, tensile strength and elongation. The tubular structure support composition may also include boron, manganese and chromium. Micro-alloying additions of boron to steel are desirable as such additions improve the mechanical properties of the steel at a relatively low cost. For example, adding boron to steel may increase hardenability of the material, e.g., the ability of steel to partially or completely transform from austenite to some fraction of martensite as a result of heat treatment. Additionally, boron is effective at relatively very low concentrations, providing significant improvements in hardenability at relatively low costs.

However, boron has not received wide use as an alloying element because boron is hard to work with in the steelmaking environment. Accordingly, traditional steel compositions rely heavily on high carbon and chromium contents to achieve the desired hardenability levels. A disadvantage of high carbon contents lies in decreased ductility, increased probability of cracking, and poor weldability. Further, the use of high chromium contents not only increases the cost of the steel but also results in decreased weldability. A steel support with decreased weldability necessitates extensive heat treatment and/or alternative techniques to attach the support to further components, such as by way of brackets, hubs or flanges that may add to the overall mass of the support. Within the context of a vehicle, steel supports with relatively high mass increase the energy or horsepower required to transport the vehicle and therefore decreases fuel and/or energy efficiency.

Therefore, the exemplary tubular structure support and the method for its production may include a lightweight boron-steel tubular structure support integrated into a seat structure of a vehicle. The steel composition may include low carbon content with the addition of alloying elements boron, manganese and chromium, with the remainder including iron and inevitable impurities. The carbon content may range from approximately 0.19 to 0.27 wt. % to retain formability and weldability while inexpensively increasing the strength of the composition. The boron content may range from approximately 0.0005% to 0.004% to improve strength and the ease in which martensite may be formed, e.g., hardenability. The manganese content may range from approximately 1.5 to 2.5 wt. % and the chromium content may be less than or equal to approximately 0.35 wt. %, both of which are added to increase the strength of the composition without sacrificing weldability.

The concentration of carbon and alloying elements along with the process used to produce this product has advantages with respect to mass, strength (e.g., yield strength and tensile strength), weldability and cost, making the exemplary tubular structure support ideal for integration into vehicles or other applications desiring lightweight supports. The support may have the following mechanical properties:

A yield strength of approximately 1170-1300 MPa;
A tensile strength greater than approximately 1475 MPa;
Elongation, or a change in length before fracture, of at least approximately 10%; and
A specific strength (e.g., mass to strength ratio) of approximately 180-195 kN·m/kg, as compared to mild steel that may have a specific strength of 40-50 kN·m/kg.

Mass savings may be derived from the boron material, which is effective in very low concentrations, and the support will maintain a strength sufficient to satisfy vigorous vehicle safety requirements. The increase in strength may be attributed to the heat treatment process along with the influence of the additive alloying elements boron, chromium and manganese. Heat treatment may be used to manipulate the mechanical properties of steel (e.g., tensile strength, yield strength, ductility, elongation) by controlling the rate of diffusion and the rate of cooling within the microstructure. The rate at which the steel is cooled through the eutectoid temperature may impact the rate at which carbon diffuses out of austenite and forms pearlite and/or martensite. If the cooling rate is rapid the austenite cannot transform to ferrite and cementite by atomic diffusion (e.g., to form pearlite and/or bainite), resulting in martensitic transformation and the formation of hard martensite. The addition of boron lowers the critical cooling rate of the steel, or the slowest cooling rate that will produce 100% martensite, and extends the process window to form tempered martensite. With the increase in strength, it is possible to reduce the mass of the product while maintaining equal structural performance.

Improved weldability may be derived from the low to mid carbon content and the addition of chromium and manganese. Weldability, or the ability of a material to be welded, may be characterized in terms equivalent carbon content or carbon equivalent (hereinafter referred to as "carbon equivalent"). In general, a higher carbon equivalent value adversely affects weldability of the base material. A high carbon content and high concentrations of alloying elements such as manganese, chromium, silicon, molybdenum, vanadium, copper, nickel and titanium increases the carbon equivalent value and thereby reflects increased hardness at the expense of weldability. Traditional steel compositions therefore necessitate elaborate procedures requiring extensive heat treatment to relieve internal stresses and avoid cracking. In contrast, the weldability of the present tubular structure support is at least comparable to the weldability of traditional steels with much lower strength. As discussed in more detail below, the exemplary tubular structure support utilizes distinctive concentrations of carbon and the alloying elements boron, manganese and chromium to obtain steel composition of acceptable weldability and hardenability for application in a structure assembly, e.g., a seat structure, a vehicle door structure, a tent frame, etc.

The following discussion is but one non-limiting example of an improved tubular structure support, for example that may be integrated into a seat structure of a vehicle, and a process for producing the same. It will be appreciated that the disclosed tubular structure support may be used in other structures and applications including, but not limited to, vehicle sub-frames, vehicle door assemblies, carriage frames, shelter frames (moveable and fixed), instrument panel reinforcements, carriage frames, furniture frames and residential and commercial structure frames and infrastructure. It will further be appreciated that a vehicle applies broadly to an object used for transporting people and/or goods by way of at least one of land, air, space and water.

Now turning to the drawings, FIG. 1 illustrates an exemplary tubular support structure 100. According to one implementation, the tubular structure support 100 may be formed from a single piece of tubing (e.g., seamless or welded) that may include an interior surface and a radially exterior surface relative to a longitudinal axis A. The support 100 may include a first end 105 and an axially opposite second end 110 relative to the longitudinal axis A. The support 100 may include a body 115 extending a predetermined length over the longitudinal axis A.

According to one implementation, the body 115 may include a substantially uniform wall thickness throughout the length of the support structure 100. Additionally or alternatively, the body 115 may define at least one of a uniform inner diameter and a uniform outer diameter. Pursuant to another implementation, the body 115 may include varying wall thicknesses, varying inner diameters, varying outer diameters, or any combination thereof. That is, the body 115 may include a plurality of sections (not shown) that may differ from one another with respect to wall thickness, inner diameter, outer diameter, or a combination thereof. Within this context, the body 115 may include at least one transition zone (not shown) disposed between adjacent sections to compensate for the varying dimensional attributes.

The support 100 may include at least one welding site 120 extending at least partially along the length and/or outer circumference of the body 115 for fixedly attaching to a structural component (not shown) and/or a functional component (not shown). According to another example, the body 115 may include a plurality of welding sites 120 disposed about the length and/or outer circumference of the body 115 for fixedly attaching to a structural component and/or a functional component. As contextual examples, a structural component may include, but is not limited to, a vehicle seat structure, a vehicle door frame, a vehicle sub-frame, a frame for furniture, tent or shelter frames. A functional component may include, but is not limited to, vehicle seat adjusters, pivotable joints, or other components relating to operating mechanisms.

The support 100 may be welded directly to the structural component (not shown) and/or the functional component (not shown) via the welding site(s) 120. As discussed in more detail below, the lightweight steel support 100 demonstrates superior weldability in relation to traditional tubular supports with substantially comparable strength. This improved weldability expands the applications available for integration of the support 100. Accordingly, the tubular structure support 100 can be connected directly to the structural component and/or the functional component via welding without the need for additional connection reinforcements such as brackets, flanges and/or hubs, as previously required with traditional tubular supports with relatively high strength and low weldability properties. As such, additional mass savings may be derived from the exclusion of the additional connection reinforcements.

Figure 2:
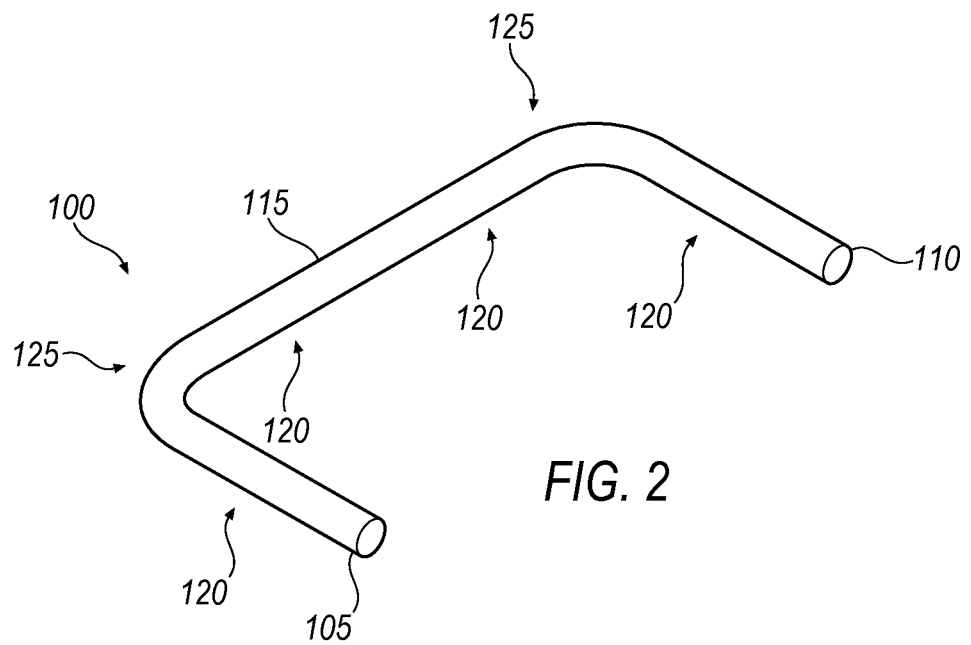
FIG. 2 illustrates the tubular structure support of FIG. 1 according to another example.

FIG. 2 illustrates an exemplary tubular structure support 100 according to another example. As many of the features of FIG. 1 correspond to the features of FIG. 2, the reference numbers 100, 105, 110, 115 and 120 will remain consistent. The description in connection with FIG. 1 therefore applies equally to the description of FIG. 2 and will not be reproduced.

The support 100 according to FIG. 2 may include at least one curvature 125 bending the body 115 in a direction transverse to the longitudinal axis A. Pursuant to the example illustrated in FIG. 2, the support 100 may include a plurality of curvatures 125. The body 115 may deviate from a substantially straight configuration to a bent configuration by way of the curvature(s) 125. Accordingly, the support 100 may be adapted to a desired configuration depending on the intended use, thereby expanding the applications for the support 100.

According to one example, the tubular structure support 100 may include elements in the following concentration ranges as set forth in Table 1, where the concentrations are provided in weight percentage (wt. %) on the basis of the total weight of the steel composition:

TABLE 1

| Element | Concentration (wt. %) | |
|---|---|---|
| | Minimum | Maximum |
| Carbon (C) | 0.19 | 0.27 |
| Manganese (Mn) | 1.5 | 2.5 |
| Chromium (Cr) | 0 | 0.35 |
| Boron (B) | 0.0005 | 0.004 |
| Iron (Fe) and impurities | Balance | |

As illustrated in Table 1, the support 100 may include a steel alloy containing carbon (C) and other alloying elements such as boron (B), manganese (Mn) and chromium (Cr). The remainder of the composition includes iron (Fe) and inevitable impurities. However, the concentration of the impurities according to one implementation is reduced to an amount as low as possible and therefore having negligible influences on the support 100 composition.

Carbon is an element whose addition inexpensively raises the strength of the steel. A carbon concentration ranging from approximately 0.19 to 0.27 wt. % provides material properties making the steel malleable, ductile and weldable while maintaining an acceptable strength for many applications. This low concentration of carbon increases the strength of the martensite as the amount of retained austenite is relatively insignificant. If the carbon concentration is less than about 0.19 wt. %, in some circumstances it may be difficult to obtain the strength desired in the composition. However, if the carbon concentration is greater than about 0.27 wt. %, toughness and weldability may be sacrificed.

Manganese may be added to increase the tensile strength and the hardenability of the steel. The additive manganese may facilitate hardenability at least in part by lowering the eutectoid temperature of the steel. With manganese concentrations of less than approximately 1.5 wt. % it may be difficult in some circumstances to achieve the desired strength in the steel. However, concentrations greater than approximately 2.5 wt. % tends to increase the carbon equivalent and may negatively influence the weldability of the steel composition. Additionally, exceeding a concentration of 2.5 wt. % may decrease the toughness of the composition.

Chromium may be added to increase corrosion resistance, hardenability and the tensile strength of the steel. Like manganese, chromium may be effective for improving the quenchability of the steel. For example, chromium (as with manganese in some applications) may facilitate inhibiting the formation of an unacceptable amount of ferrite and pearlite from austenite during quenching. However, high concentrations of chromium, e.g., above approximately 0.35 wt. %, may negatively influence hardenability by raising the eutectoid temperature due to chromium's tendency to destabilize austenite.

The use of large quantities of chromium, molybdenum, nickel and vanadium for example increases the carbon equivalent content which not only increases the overall cost but requires extensive heat treatment to remove internal stresses and brittleness to achieve acceptable weldability. In contrast, the support 100 does not use relatively high concentrations of alloying elements such as chromium, molybdenum, vanadium, and nickel while at the same time maintaining acceptable strength and weldability that does not require extensive heat treatment.

Boron is an element whose addition is effective in increasing the strength and hardenability of the steel at very low costs. For example, boron may improve hardenability at least in part by inhibiting the formation of ferrite via migrating to austenite grain boundary and thereby improve the ease with which martensite may be formed. If the boron concentration is too low, e.g., below approximately 0.0005 wt. %, it may be difficult to obtain the desired hardenability of the steel. On the other hand, if the boron concentration is too high, e.g., greater than approximately 0.004 wt. %, toughness and weldability of the steel may be decreased.

A boron concentration of 0.0005-0.004 wt. % improves the strength of the steel for example by lowering the critical cooling rate. The strength of martensite is reduced as the amount of retained austenite grows. If the cooling rate is slower than the critical cooling rate some amount of pearlite will form influencing the strength of the steel. As the cooling rate increases and approaches the critical cooling rate, an increasingly large percentage of the austenite transforms to martensite. The addition of boron lowers the critical cooling rate resulting in a high hardenability, and may also extend the process window to form the superior tempered martensite microstructure. A high hardenability improves the strength of the steel as a significant amount of hard martensite is retained in the microstructure, which is achieved at relatively low effort from the addition of boron. Accordingly, production costs are lowered by reducing the extent and rate of cooling. Further, martensite has a lower density than austenite, such that high amounts of retained martensite results in a corresponding change of volume. Thus, mass savings may be derived from the boron additive as more martensite is formed even at slower cooling rates.

In order to achieve the benefit of improved hardenability, boron should remain in its unbonded, elemental state. However, boron may react with impurities such as oxygen and nitrogen to form undesirable boron containing compounds or bonded boron, including but not limited to boron oxide and boron nitride. When boron forms these other compounds, the positive effect of improving hardenability may be compromised. According to one example, therefore, the impurities contained in the steel may be limited to an amount as low as possible to decrease the presence of bonded boron. Additionally or alternatively, subjecting the boron-steel tubular structure support 100 to a post-heat treatment process, such as controlled quenching/tempering, may limit the formation of bonded boron and preserve the concentration of unbonded boron. That is, adding boron to steel in a concentration of about 0.0005-0.004 wt. % according to the process disclosed in more detail below may lower the critical cooling rate during quenching to improve hardenability and thereby extend the process window to form tempered martensite, thus reducing the effort required during heat treatment.

Figure 3:
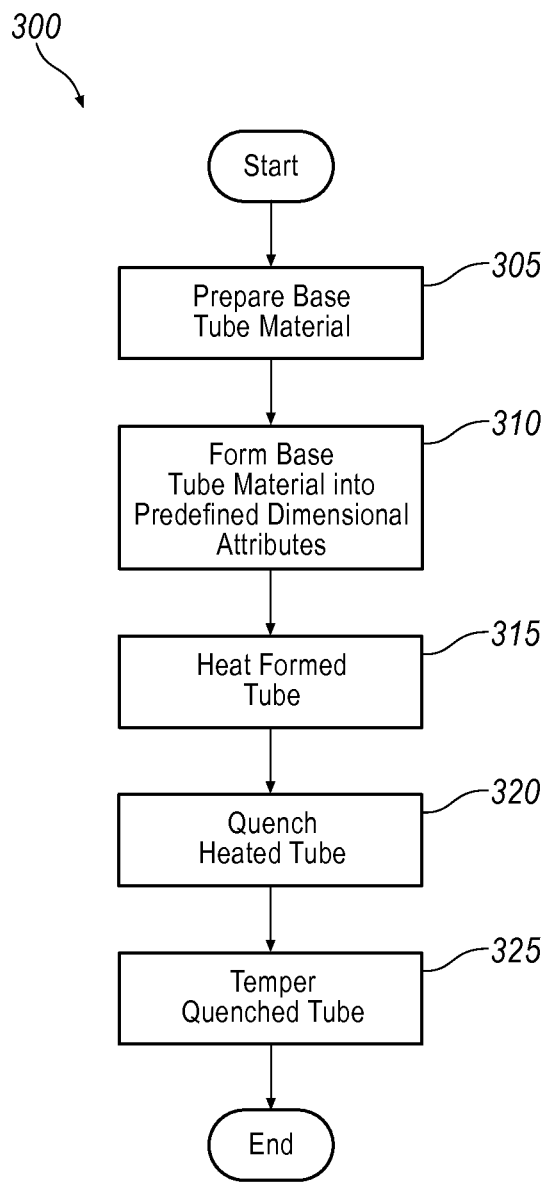
FIG. 3 illustrates an exemplary process for producing the exemplary tubular structure support.

FIG. 3 illustrates an exemplary process 300 for producing a tubular structure support 100 for integration into a structure assembly, such as a vehicle seat.

At block 305, the base tube material may be selected with a predetermined thickness and width. The base tube material may be composed of low-alloy steel that may include carbon, boron, manganese and chromium. The remainder of the composition includes iron (Fe) and inevitable impurities. The carbon content may range from approximately 0.19 to 0.27 wt. % to retain formability and weldability while inexpensively increasing the strength of the composition. The boron content may range from approximately 0.0005 to 0.004 wt. % to improve strength and the ease in which martensite may be formed, e.g., hardenability. The manganese content may range from approximately 1.5 to 2.5 wt. % and the chromium content may be less than or equal to approximately 0.35 wt. %, both of which are added to increase the strength of the composition without sacrificing weldability.

At block 310, the base tube material may be formed to correspond to predetermined dimensional attributes, such as cross-section, inner diameter, outer diameter and wall thickness. The base tube material may then be cut to a specific length to define a formed tubular support. Additionally, the formed tubular support may be bent at a predetermined curvature(s) 125 position(s) to define a desired shape. The formed tubular support 100 may then be subjected to heat treatment achieve improved mechanical properties such as strength, weldability and ductility.

At block 315, the formed tubular support is rapidly heated, for example via induction heating, to an austenitizing temperature for a predetermined duration to austenitize the steel composition. That is, the steel composition is heated to a temperature above the eutectoid temperature, e.g., the austenitizing temperature, at which the steel composition transforms to the crystal structure from ferrite to austenite. Although the temperature may depend at least partially on the specific concentrations of the steel composition, an exemplary austenitizing temperature may range from 850 to 970° C. The predetermined duration may last until substantially all of the ferrite is transformed into austenite to prevent undissolved carbides from migrating to the matrix. That is, the predetermined duration may span until austenitization is complete, e.g., until substantially all the ferrite transforms into austenite. However, depending on the desired resulting mechanical properties, the predetermined duration may last only until at least part of the ferrite transforms into austenite (e.g., a duration sufficient for incomplete initial austenitization). According to one example, the austenitizing temperature may be maintained for 10-18 seconds.

At block 320, the austenitic steel composition may be rapidly cooled or quenched at a predefined cooling rate to transform the austenitic steel composition to a martensite microstructure. The quenching treatment for the austenitic steel composition may be carried out by using water, quenching oil and/or air, for example. The boron concentration of approximately 0.0005 to 0.004 wt. % lowers the critical cooling rate for forming a martensitic microstructure. The cooling rate may determine the relative proportions of martensite to austenite, and therefore may determine the mechanical properties of the steel such as strength, hardness and ductility. Pursuant to one implementation, the predefined cooling rate may be 27 K/s or faster to form a sufficient amount of martensite. According to another implementation the predefined cooling rate may approach 100 K/s, and in some circumstances the predefined cooling rate may exceed 100 K/s. Lowering the critical cooling rate, e.g., at a rate of 27 K/s facilitates extending the process window for forming tempered martensite and therefore improves the strength of the composition.

At block 325, the quenched steel may be subjected to a tempering treatment to further increase the tensile strength, ductility and fatigue life of the steel. Tempering may transform some of the brittle martensite into tempered martensite and thereby reduce the some excess hardness and increase weldability. According to one example, the tempering treatment for the quenched steel may be executed at a temperature below the lower arrest temperature ($A_1$), e.g., the austenitizing temperature. Additionally or alternatively, the tempering treatment may be executed at a temperature just above the martensite start temperature (Ms), e.g., at a temperature above the martensite transformation region. The temperature may vary based on the steel composition, but may range for example between 220-400° C. for an appropriate duration to impart ductility to the martensite microstructure. The tempered steel support 100 may then be re-quenched using water or quenching oil, or allowed to steadily cool (e.g., by way of air or other gas) resulting in the exemplary tubular structure support 100.

Following step 325, the tubular structure support 100 may be integrated into a structure assembly, for example a seat structure of a vehicle. Then the process ends.

The resulting tubular structure support 100 of lightweight boron steel in accordance with the disclosure demonstrates superior mechanical properties such as strength and weldability in relation to the relatively light weight composition as compared to traditional tubular supports. The support 100 may include the following mechanical properties:

Yield strength of approximately 1170-1300 MPa;

Tensile strength greater than approximately 1475 MPa;

Elongation, or a change in length before fracture, of approximately 10% or greater; and Specific strength (e.g., mass to strength ratio) of approximately 180-195 kN·m/kg.

Mass savings may be derived from the inexpensive and low concentration of boron, e.g., by way of martensite transformation resulting from the heat treatment that may provide increased strength. With this increase in strength, along with strength increasing concentrations of chromium and manganese, the overall mass of the tubular structure support 100 may be reduced while maintaining at least equal structural performance compared to tubular supports of greater mass. As just one example, the support 100 includes a specific strength of about 180-195 kN·m/kg, whereas a comparable mild steel may have a specific strength of about 40-50 kN·m/kg. Consequently, cost savings of materials is increased.

In addition, the exemplary support 100 does not include relatively significant concentrations of various alloying elements contained in traditional tubular supports, such as nickel, niobium, nitrogen, vanadium, aluminum, sulfur, silicon, titanium, columbium, molybdenum, titanium, zirconium, or a combination thereof. Traditional tubular supports may contain most if not all of these elements for added strength and hardenability. However, these additional elements sacrifice mass savings for support strength and therefore contribute to increased fuel consumption (e.g., decreased fuel efficiency) when integrated into vehicles. To that end, these alloying elements substantially increase the material cost of the tubular supports as well as production expenses. Further, higher alloy element concentrations may result in poor weldability of the steel because these alloying elements tend to increase hardness and decrease weldability. The exemplary tubular structure support 100 provides a lightweight and relatively low cost improvement to the expensive traditional tubular supports while maintaining at least equal structural performance and sufficient weldability for integration into structure assembly such as a seat structure of a vehicle.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A support, comprising:
   a hollow metallic tube having two opposing ends and a body extending over a longitudinal axis of the tube, wherein the tube has a steel composition consisting of, by weight percentage:
   approximately 0.19 to 0.27% carbon;
   approximately 0.0005% to 0.004% boron;
   approximately 1.5% to 2.5% manganese;
   less than or equal to approximately 0.35% chromium; and
   a balance of iron and inevitable impurities.

2. The support of claim 1, wherein the tube has a yield strength of 1170-1300 MPa.

3. The support of claim 1, wherein the tube has a tensile strength greater than 1475 MPa.

4. The support of claim 1, wherein the tube has an elongation of at least 10%.

5. The support of claim 1, wherein the tube has a specific strength of 180-195 kN·m/kg.

6. The support of claim 1, wherein the steel composition has a predominately martensitic microstructure.

7. The support of claim 1, wherein the tube is integrated into a seat frame.

8. A support integrated into a seat structure of a vehicle, comprising:
   a hollow metallic tube having two opposing ends and a body extending over a longitudinal axis of the tube, wherein the tube is composed of an austenitized steel material having a predominately martensite microstructure and has a composition consisting of, by weight percentage:
   approximately 0.19% to 0.27% carbon;
   approximately 0.0005% to 0.004% boron;
   approximately 1.5% to 2.5% manganese;
   less than or equal to about 0.35% chromium; and
   the balance including iron and inevitable impurities.

9. The support of claim 8, wherein the tube includes at least one curvature bending the body in a direction transverse to the longitudinal axis.

10. The support of claim 8, wherein the tube includes a yield strength of 1170-1300 MPa.

11. The support of claim 8, wherein the tube includes a tensile strength greater than 1475 MPa.

12. The support of claim 8, wherein the tube includes an elongation of at least 10%.

13. The support of claim 8, wherein the tube has a specific strength of 180-195 kN·m/kg.

14. A process for producing a tubular support for a vehicle seat, comprising:
   providing a steel composition consisting of, by weight percentage, elements in the following concentrations:
   approximately 0.19% to 0.27% carbon,
   approximately 0.0005% to 0.004% boron,
   approximately 1.5% to 2.5% manganese,
   less than or equal to about 0.35% chromium, the balance including iron and inevitable impurities;
   heating the steel composition to an austenitizing temperature for a predetermined duration to austenitize the steel composition; and
   cooling the austenitized steel composition at a predefined cooling rate to transform the austenitic steel composition to a martensite microstructure, wherein the predefined cooling rate is greater than 27 K/s.

15. The process of claim 14, wherein the predefined cooling rate is about 100 K/s or greater.

16. The process of claim 14, wherein the austenitizing temperature ranges from 850 to 970° C.

17. The process of claim 14, wherein the predetermined duration ranges from 10 to 18 seconds.

18. The process of claim 14, further comprising tempering the steel composition at a predetermined tempering temperature for a predetermined tempering duration, wherein the predetermined tempering temperature ranges from 220 to 400° C.

19. The process of claim 14, wherein the steel composition includes at least one of the following:
   a yield strength of 1170-1300 MPa;
   a tensile strength greater than 1475 MPa;
   an elongation of at least 10%; and
   a specific strength of 180-195 kN·m/kg.

20. The process of claim 14, wherein the steel composition has a critical cooling rate of 27 K/s.

* * * * *